E. SWASEY.
Vehicle Wheel.

No. 96,502.  Patented Nov. 2, 1869.

Witnesses:
Edward Griffith.
Edmund H. Hewins

Inventor:
Edwin Swasey.
by his Attorney,
Frederick Curtis

United States Patent Office.

EDWIN SWASEY, OF MILFORD, MASSACHUSETTS.

Letters Patent No. 96,502, dated November 2, 1869.

IMPROVEMENT IN WHEELS.

The Schedule referred to in these Letters Patent and making part of the same.

*To all to whom these presents shall come:*

Be it known that I, EDWIN SWASEY, of Milford, in the county of Worcester, and State of Massachusetts, have made an invention of a new and useful Manufacture of Wheels for various purposes; and do hereby declare the following to be a full, clear, and exact description thereof, due reference being had to the accompanying drawings, making part of this specification, and in which—

Figure 1:
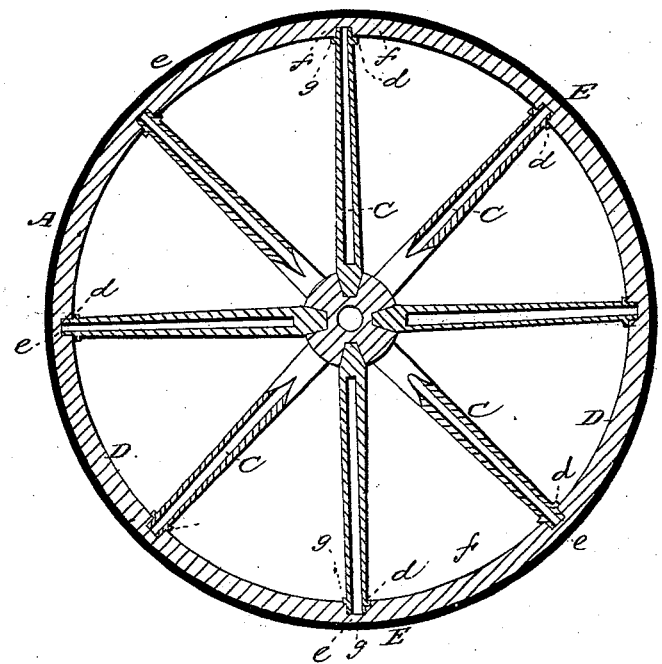

Figure 1 is a longitudinal section, and

Figure 2:
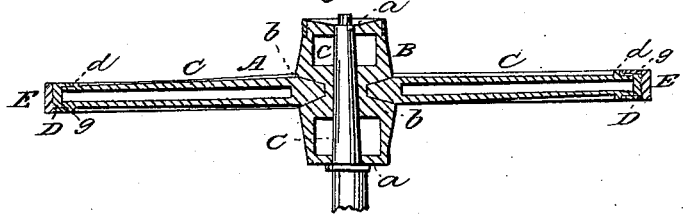

Figure 2, a transverse section of a wheel constructed in accordance with my invention.

The object of this invention is to produce a wheel, for adaptation to various land-conveyances, such as carriages, velocipedes, steam fire-engines, or vehicles of any description, as well as to various other purposes, which shall be light, strong, and durable, and capable of being manufactured at reasonable cost.

In the accompanying drawings, which illustrate my invention, a wheel is shown at A, as composed of a hub, B, spokes, C C C, &c., felloe, D, and tire, E. The general arrangement of such parts being substantially the same as in wheels now in general use.

In carrying out my invention, I form each spoke of the wheel of a cylindrical tube, either tapering or of equal diameter from end to end, according to circumstances, the base of each spoke, and in some instances, perhaps, the outer extremities being solid.

The hub of the wheel is composed of metal, preferably of cast-iron, on account of its low cost, such hub, in order to obtain the requisite lightness, being hollow, with the exception of an annular flange, *a*, at each end, and a central annular rib or extension, *b*, the openings of the flanges *a a*, and of the rib *b*, being concentric with the axis of the hub, and forming bearings for the journal of the axle, the intervening chambers or spaces *c c* of the hub, serving as receptacles of the lubricating-material.

The base of each spoke, which, as before observed, is preferably solid, is driven tightly, or otherwise securely fixed within a series of holes made radially within the circumference of the hub, the central rib *b*, before mentioned, creating a firm bearing of considerable length for each spoke.

In practice, it might, in some cases, be deemed advantageous to dispose this annular rib upon the outside circumference of the hub, which may be done without affecting the character of this portion of my invention.

The outer end of each spoke is provided with an annular washer, *d*, and a tenon, *e*, as represented.

The union of the extremities of the two portions *f f* of the felloe, are effected by a metallic clasp, *g*, which overlaps the two contiguous ends of such portions, such ends abutting closely against each other.

The tenon of the spoke passes through the metallic clasp, and nearly through the joint between the two abutting ends of the felloe, the tenon being admitted into the wood to such an extent that its washer *d* shall abut against the outside of the metallic clasp, by this means forming two bearings or points of support for the spoke, one being, as before remarked, the contact of the washer with the clasp, and the other the extreme end of the tenon against the wood of the felloe.

The tenons of the spokes intervening between the metallic clasps, before mentioned, are simply let into the felloe, as shown in fig. 1 of the drawings, in which case the double bearing of the washer, and the end of the tenon is obtained.

The peculiar mode of joining the ends of the felloes, and the combining therewith of the spoke, produces great strength at this point, which is usually the first to give out in wheels of ordinary manufacture.

The employment of a metallic hub and spokes, as will be apparent to any intelligent person, produces great strength, solidity, and durability, and renders the loosening of the spokes within the hub impossible.

A joint of this description is affected neither by dryness nor moisture, and will be maintained in a perfect condition for a great length of time.

Claims.

Having thus described the nature, construction, and utility of my invention,

What I believe to be novel, and original with myself, and desire to secure by Letters Patent of the United States, is as follows:

1. The peculiar joint at the two abutting ends of portions of the felloe, the same consisting of the overlapping clasp *g*, enclosing the ends of the felloe, as explained, and the spoke B, with its washer *d* and tenon *e*, the whole being combined and arranged in manner and for the purpose as herein shown and explained.

2. A carriage-wheel, composed of the hollow spokes and felloes jointed together, as specified in the preceding clause, in combination with the metallic hub provided with flanges *a*, rib *b*, and lubricating-chamber *c*, as and for the purposes herein shown and described.

EDWIN SWASEY.

Witnesses:
LEON J. WILSON,
ARON WALDREN.